(12) United States Patent
Park et al.

(10) Patent No.: US 12,452,428 B2
(45) Date of Patent: Oct. 21, 2025

(54) METHOD AND APPARATUS FOR VIDEO CODING USING MAPPING OF RESIDUAL SIGNALS

(71) Applicants: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

(72) Inventors: Sea Nae Park, Seoul (KR); Joo Hyung Byeon, Seoul (KR); Dong Gyu Sim, Seoul (KR); Jin Heo, Yongin-si (KR); Seung Wook Park, Yongin-si (KR)

(73) Assignees: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 0 days.

(21) Appl. No.: 18/740,109

(22) Filed: Jun. 11, 2024

(65) Prior Publication Data
US 2024/0333936 A1 Oct. 3, 2024

Related U.S. Application Data

(63) Continuation of application No. PCT/KR2022/016222, filed on Oct. 24, 2022.

(30) Foreign Application Priority Data

Dec. 15, 2021 (KR) .................. 10-2021-0179331
Oct. 21, 2022 (KR) .................. 10-2022-0136334

(51) Int. Cl.
H04N 19/00 (2014.01)
H04N 19/132 (2014.01)
(Continued)

(52) U.S. Cl.
CPC ......... H04N 19/132 (2014.11); H04N 19/176 (2014.11); H04N 19/186 (2014.11);
(Continued)

(58) Field of Classification Search
CPC .. H04N 19/132; H04N 19/176; H04N 19/186; H04N 19/46; H04N 19/50;
(Continued)

(56) References Cited

U.S. PATENT DOCUMENTS 10,477,252 B2    11/2019  Sim
10,506,232 B2    12/2019  Minoo
(Continued)

FOREIGN PATENT DOCUMENTS

KR    20160148836 A    12/2016
KR    20170058870 A     5/2017
(Continued)

OTHER PUBLICATIONS

International Search Report and Written Opinion cited in corresponding international patent application No. PCT/KR2022/016222; Feb. 16, 2023; 10 pp.

Primary Examiner — Frank F Huang
(74) Attorney, Agent, or Firm — Lempia Summerfield Katz LLC

(57) ABSTRACT

A method and an apparatus are disclosed for video coding using a mapping of residual signals. The video coding method and the apparatus enable the video encoding device to transmit mapping data related to a mapping of the residual signals of the current block to improve video coding efficiency and enhance video quality. The video coding method
(Continued)

and the apparatus enable the video decoding device to decode the residual signals based on the mapping data.

18 Claims, 12 Drawing Sheets

(51) Int. Cl.
*H04N 19/176* (2014.01)
*H04N 19/186* (2014.01)
*H04N 19/46* (2014.01)
*H04N 19/50* (2014.01)
*H04N 19/82* (2014.01)

(52) U.S. Cl.
CPC ............. *H04N 19/46* (2014.11); *H04N 19/50* (2014.11); *H04N 19/82* (2014.11)

(58) Field of Classification Search
CPC ...... H04N 19/82; H04N 19/103; H04N 19/11; H04N 19/117; H04N 19/119; H04N 19/137; H04N 19/593; H04N 19/70; H04N 19/96
See application file for complete search history.

(56) References Cited

U.S. PATENT DOCUMENTS

| | | | |
|---|---|---|---|
| 10,674,150 B2 | 6/2020 | Baylon | |
| 10,873,747 B2 | 12/2020 | Cheong | |
| 10,917,664 B2 | 2/2021 | Sim | |
| 11,070,809 B2 | 7/2021 | Baylon | |
| 11,277,610 B2 | 3/2022 | Minoo | |
| 11,451,837 B2 | 9/2022 | Sim | |
| 11,575,899 B2 | 2/2023 | Minoo | |
| 11,659,183 B2 | 5/2023 | Baylon | |
| 11,750,814 B2 | 9/2023 | Minoo | |
| 2016/0373768 A1 | 12/2016 | Sim | |
| 2017/0085879 A1 | 3/2017 | Minoo | |
| 2017/0085880 A1 | 3/2017 | Minoo | |
| 2017/0085889 A1 | 3/2017 | Baylon | |
| 2020/0029100 A1 | 1/2020 | Sim | |
| 2020/0059646 A1 | 2/2020 | Minoo | |
| 2020/0162734 A1 | 5/2020 | Cheong | |
| 2020/0288132 A1 | 9/2020 | Baylon | |
| 2020/0395117 A1* | 12/2020 | Schnorr | G06N 3/088 |
| 2021/0000449 A1* | 1/2021 | Deo | A61B 5/7267 |
| 2021/0127142 A1 | 4/2021 | Sim | |
| 2021/0158512 A1* | 5/2021 | Sun | G06T 13/80 |
| 2021/0240825 A1* | 8/2021 | Kutt | G06F 21/563 |
| 2021/0240826 A1* | 8/2021 | Kutt | G06N 20/00 |
| 2021/0314570 A1 | 10/2021 | Baylon | |
| 2022/0036523 A1* | 2/2022 | Moran | G06T 5/70 |
| 2022/0051781 A1* | 2/2022 | Laaksonen | G06N 3/08 |
| 2022/0166981 A1 | 5/2022 | Minoo | |
| 2022/0210476 A1 | 6/2022 | Choi | |
| 2023/0141102 A1 | 5/2023 | Minoo | |
| 2023/0188384 A1* | 6/2023 | Claffey | H04L 25/022 375/262 |
| 2023/0196803 A1* | 6/2023 | Roessler | G06V 10/771 382/181 |
| 2023/0206700 A1* | 6/2023 | Khan | G06V 40/165 382/116 |
| 2023/0254488 A1 | 8/2023 | Baylon | |
| 2023/0273291 A1* | 8/2023 | Ozturk | G01S 7/006 342/52 |
| 2023/0281751 A1* | 9/2023 | Yan | G06N 3/0464 382/100 |
| 2023/0362376 A1 | 11/2023 | Minoo | |
| 2024/0179353 A1 | 5/2024 | Sim | |

FOREIGN PATENT DOCUMENTS

| | | |
|---|---|---|
| KR | 20200093694 A | 8/2020 |
| KR | 20210130234 A | 10/2021 |

* cited by examiner

METHOD AND APPARATUS FOR VIDEO CODING USING MAPPING OF RESIDUAL SIGNALS

CROSS-REFERENCE TO RELATED APPLICATIONS

This application is a continuation of International Application No. PCT/KR2022/016222 filed on Oct. 24, 2022, which claims priority to and the benefit of Korean Patent Application No. 10-2021-0179331, filed on Dec. 15, 2021, and Korean Patent Application No. 10-2022-0136334, filed on Oct. 21, 2022, the entire contents of each of which are incorporated herein by reference.

TECHNICAL FIELD

The present disclosure relates to a video coding method and an apparatus using a mapping of residual signals.

BACKGROUND

The statements in this section merely provide background information related to the present disclosure and do not necessarily constitute prior art.

Since video data has a large amount of data compared to audio or still image data, the video data requires a lot of hardware resources, including a memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required. In particular, with a diverse distribution of sample values in a video, the entropy of the residual signals increases, which can lead to a decrease in coding performance. Therefore, to improve video coding efficiency and enhance video quality, there is a need for a method of dealing with various distributions of residual signals.

SUMMARY

The present disclosure seeks to provide a video coding method and an apparatus for allowing the video encoding device to transmit mapping data related to a mapping of the residual signals of the current block to improve video coding efficiency and enhance video quality. The video coding method and the apparatus allow a video decoding device to decode the residual signals based on the mapping data.

At least one aspect of the present disclosure provides a method of decoding a current block by a video decoding device. The method includes decoding, from a bitstream, prediction information of the current block, mapping data, and mapping samples of the current block. Here, the mapping samples is residual samples mapped by the video encoding device based on the mapping data. The method also includes generating the residual samples based on inverse mapping data corresponding to the mapping data by inversely mapping the mapping samples from a mapping range to a residual range. The method also includes generating a prediction block of the current block by using the prediction information. The method also includes generating a reconstructed block that is included in a reconstructed video by adding the prediction block and the residual samples.

Another aspect of the present disclosure provides a method encoding a current block by a video encoding device. The method includes determining prediction information of the current block and mapping data of the current block. The method also includes generating a prediction block of the current block by using the prediction information and generating residual samples by subtracting the prediction block from the current block. The method also includes generating mapping samples by mapping the residual samples from a residual range to a mapping range by using the mapping data. The method also includes encoding the prediction information, the mapping samples, and the mapping data.

Yet another aspect of the present disclosure provides a computer-readable recording medium storing a bitstream generated by a video encoding method. The video encoding method includes determining prediction information of the current block and mapping data of the current block. The video encoding method also includes generating a prediction block of the current block by using the prediction information and generating residual samples by subtracting the prediction block from the current block. The video encoding method also includes generating mapping samples by using the mapping data by mapping the residual samples from a residual range to a mapping range. The video encoding method also includes encoding the prediction information, the mapping samples, and the mapping data.

As described above, the present disclosure provides a video coding method and an apparatus for allowing the video encoding device to transmit mapping data related to a mapping of the residual signals of the current block and for allowing the video decoding device to decode the residual signals based on the mapping data. Thus, the video coding method and the apparatus improve video coding efficiency and enhance video quality.

DETAILED DESCRIPTION

Figure 1:
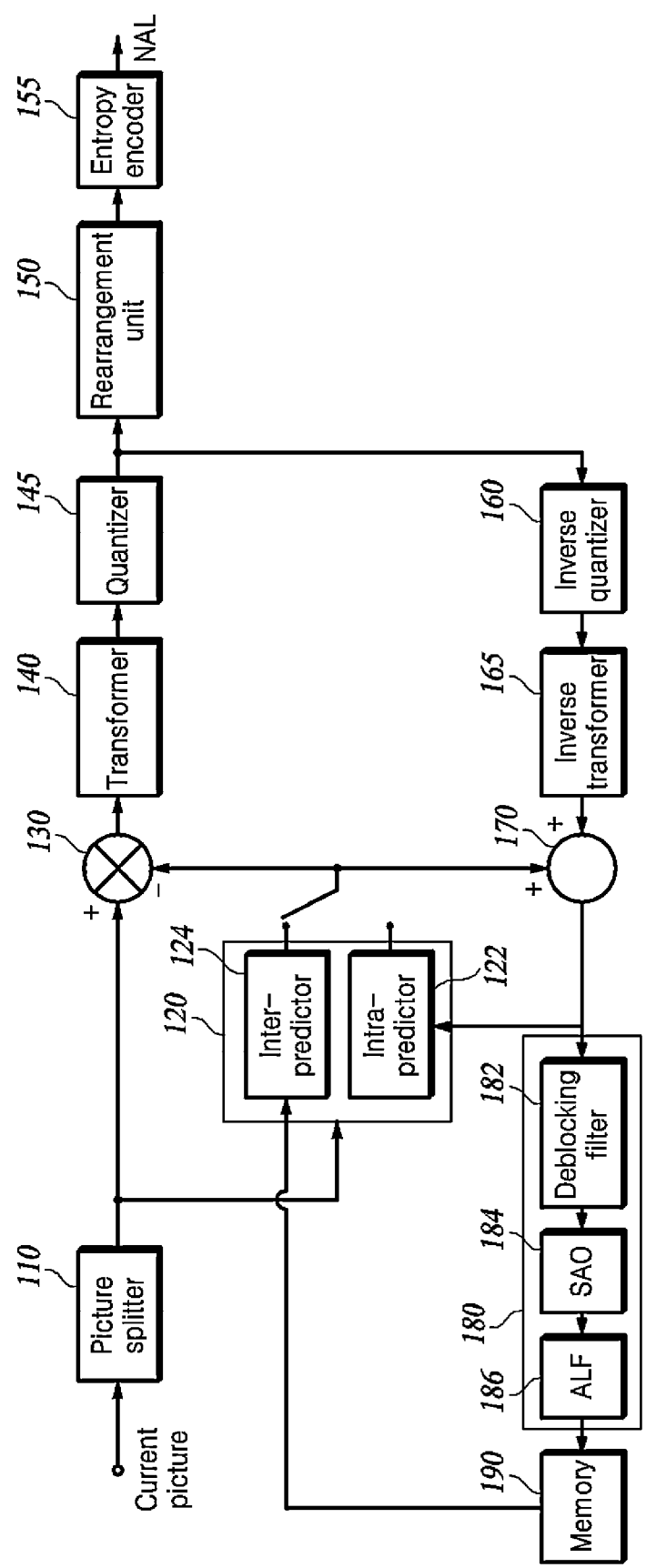
FIG. 1 is a block diagram of a video encoding apparatus that may implement the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure may be omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each coding unit (CU) is encoded as a syntax of the CU, and information commonly applied to the CUS included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a binarytree ternarytree (BTTT) is added to the tree structures to be referred to as a multiple-type tree (MTT).

Figure 2:
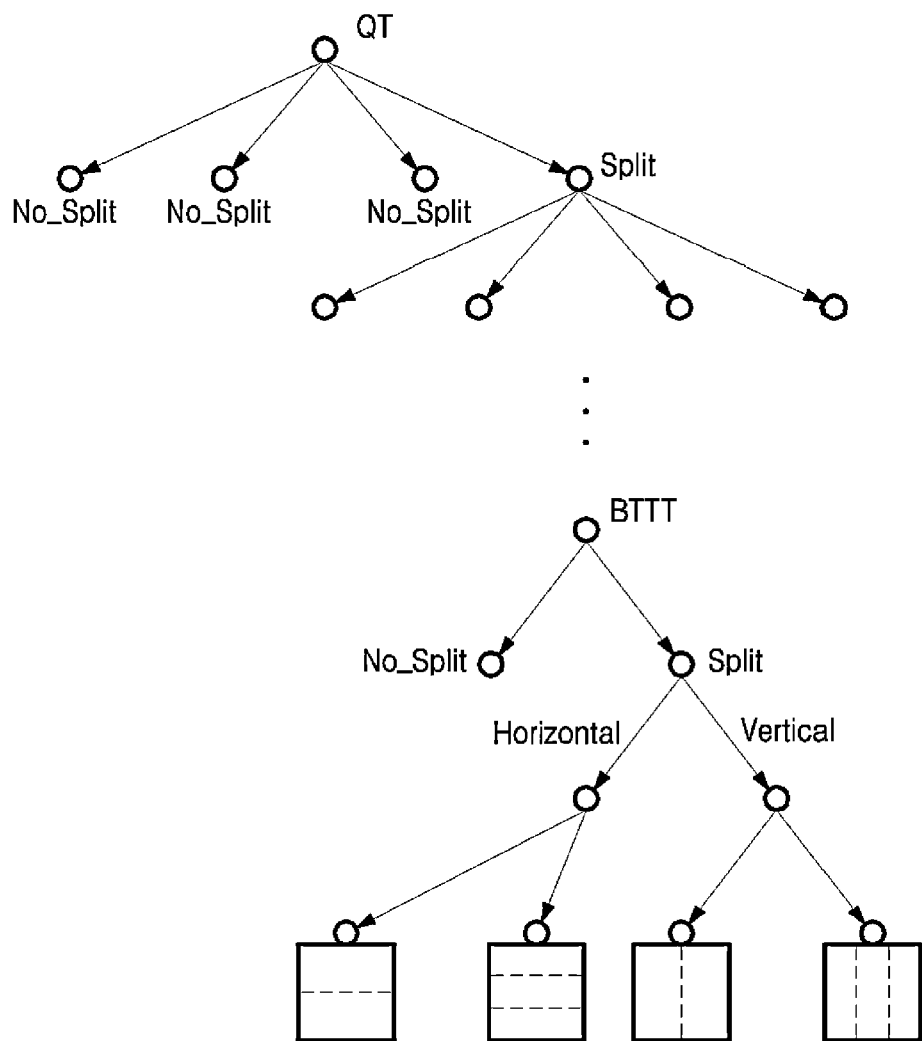
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus.

Meanwhile, a type in which the block of the corresponding node is split into two blocks asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block." As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
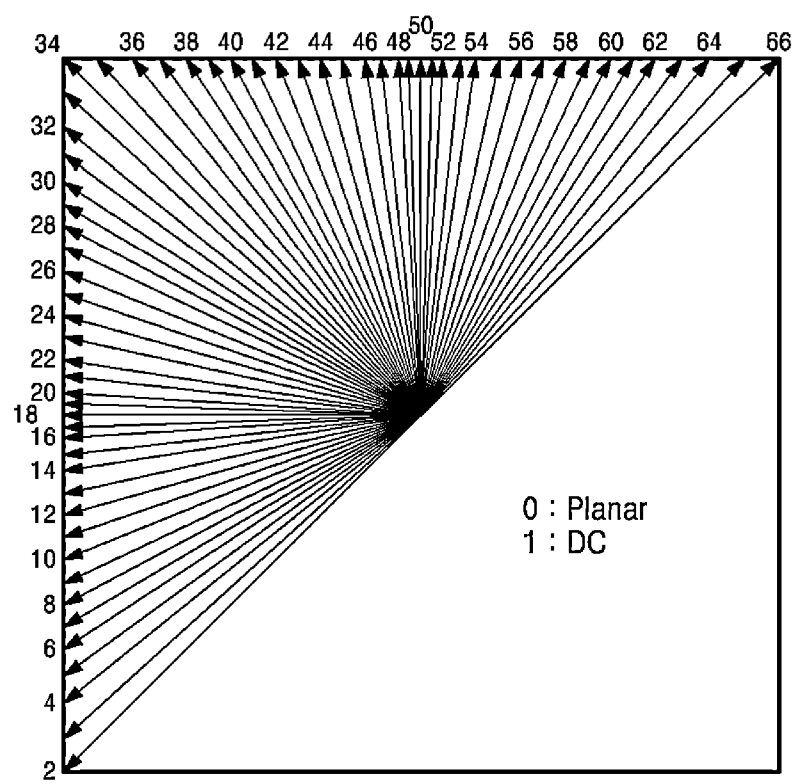
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
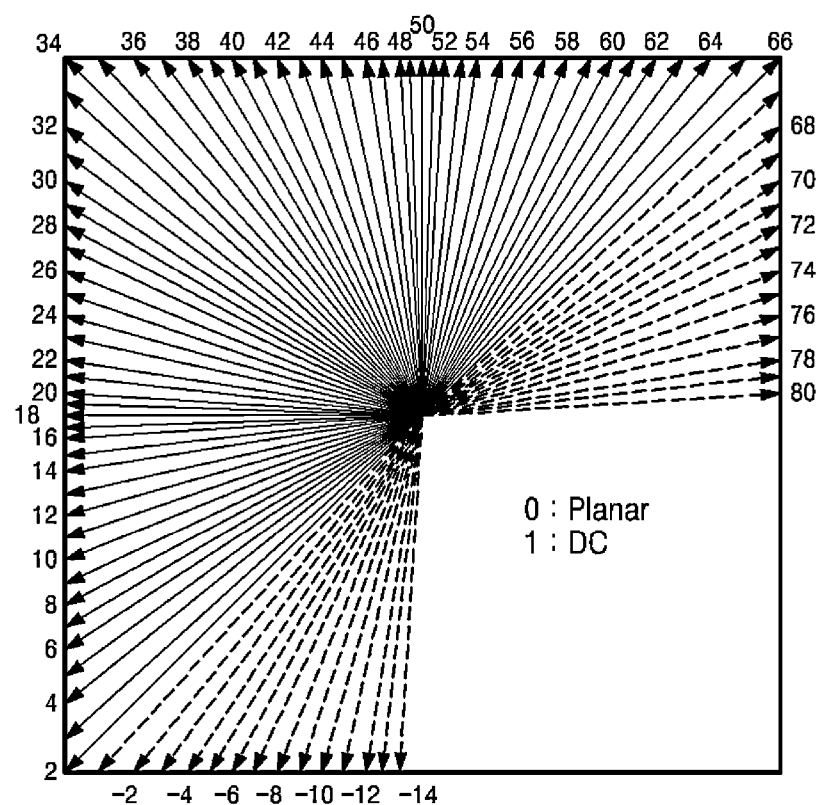

For efficient directional prediction for the current block having a rectangular shape, directional modes (#67 to #80, intra prediction modes #-1 to #-14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and may also select an appropriate intra prediction mode to be used from tested modes. For example, the intra predictor 122 may calculate rate-distortion values by using a rate-distortion analysis for multiple tested intra prediction modes and may also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, and the like. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and including information on two motion vectors is delivered to the entropy encoder 155. Here, reference picture list 0 may be constituted by pictures before the current picture in a display order among pre-reconstructed pictures, and reference picture list 1 may be constituted by pictures after the current picture in the display order among the pre-reconstructed pictures. However, although not particularly limited thereto, the pre-reconstructed pictures after the current picture in the display order may be additionally included in reference picture list 0. Inversely, the pre-reconstructed pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
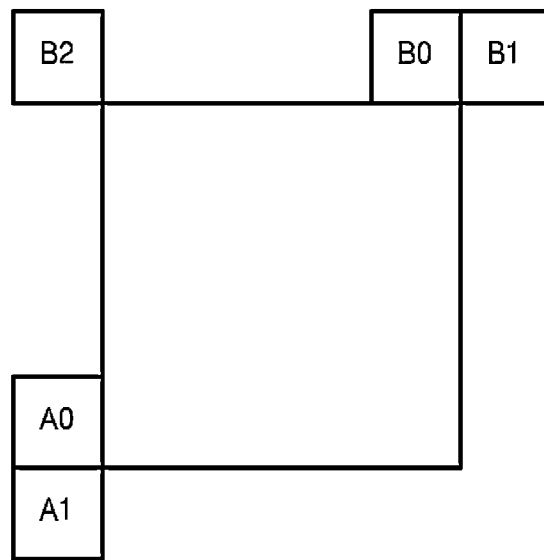
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, and the like) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to quantized transform coefficients arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information, such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to reconstruct the residual block.

The adder 170 adds the reconstructed residual block and the prediction block generated by the predictor 120 to reconstruct the current block. Pixels in the reconstructed current block may be used as reference pixels when intra-predicting a next-order block.

The loop filter unit 180 performs filtering for the reconstructed pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the reconstructed blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the reconstructed pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The reconstructed block filtered through the deblocking filter 182, the SAO filter 184, and the ALF 186 is stored in the memory 190. When all blocks in one picture are reconstructed, the reconstructed picture may be used as a reference picture for inter predicting a block within a picture to be encoded afterwards.

Figure 5:
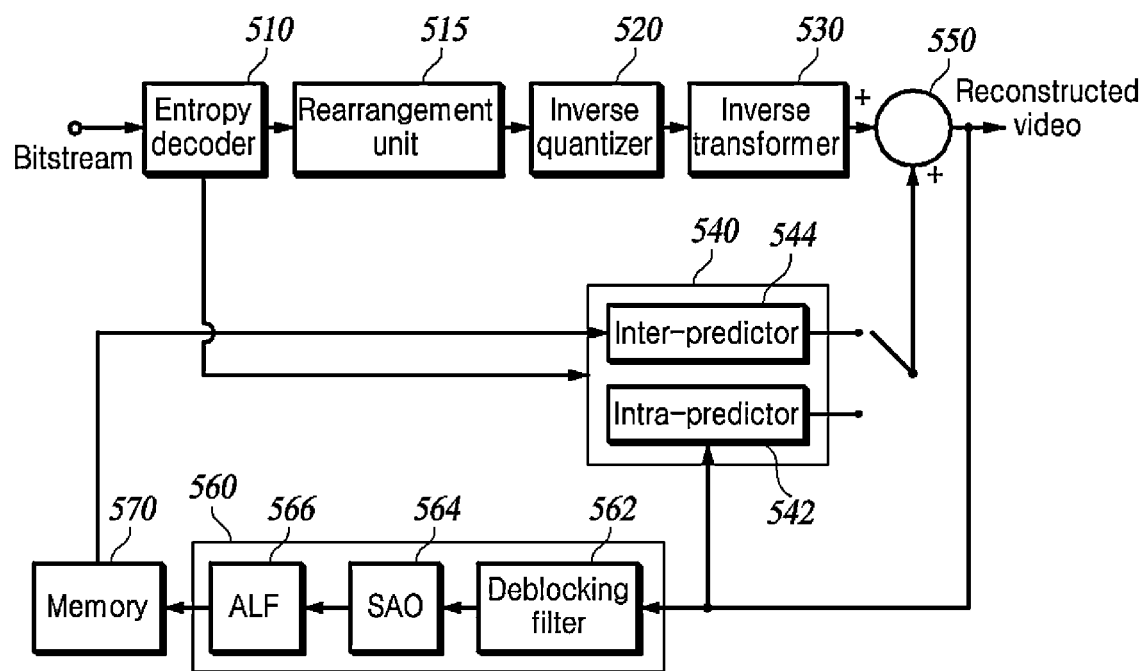
FIG. 5 is a block diagram of a video decoding apparatus that may implement the techniques of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for reconstructing the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur, or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT is further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by reconstructing the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to reconstruct the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 reconstructs the current block by adding the residual block output from the inverse transformer 530 and the prediction block output from the inter predictor 544 or the intra predictor 542. Pixels within the reconstructed current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the reconstructed blocks in order to remove the blocking artifact, which occurs due to block unit decoding. The SAO filter 564 and the ALF 566 perform additional filtering for the reconstructed block after the deblocking filtering in order to compensate differences between the reconstructed pixels and original pixels, which occur due to lossy coding. The filter coefficients of the ALF are determined by using information on filter coefficients decoded from the bitstream.

The reconstructed block filtered through the deblocking filter 562, the SAO filter 564, and the ALF 566 is stored in the memory 570. When all blocks in one picture are reconstructed, the reconstructed picture may be used as a reference picture for inter predicting a block within a picture to be encoded afterwards.

The present disclosure in some embodiments relates to encoding and decoding video images as described above. More specifically, the present disclosure provides a video coding method and an apparatus for enabling the video encoding device to transmit mapping data related to a mapping of residual signals of the current block, and the video decoding device to decode the residual signals based on the mapping data.

The video encoding device when encoding the current block may generate signaling information associated with the present embodiments in terms of optimizing rate distortion. The video encoding device may use the entropy encoder 155 to encode the signaling information and transmit it to the video decoding device. The video decoding device may use the entropy decoder 510 to decode, from the bitstream, the signaling information associated with decoding the current block.

In the following description, the term "target block" may be used interchangeably with the current block or coding unit (CU). The term "target block" may refer to some region of the coding unit.

Further, the value of one flag being true indicates when the flag is set to 1. Additionally, the value of one flag being false indicates when the flag is set to 0.

Figure 6:
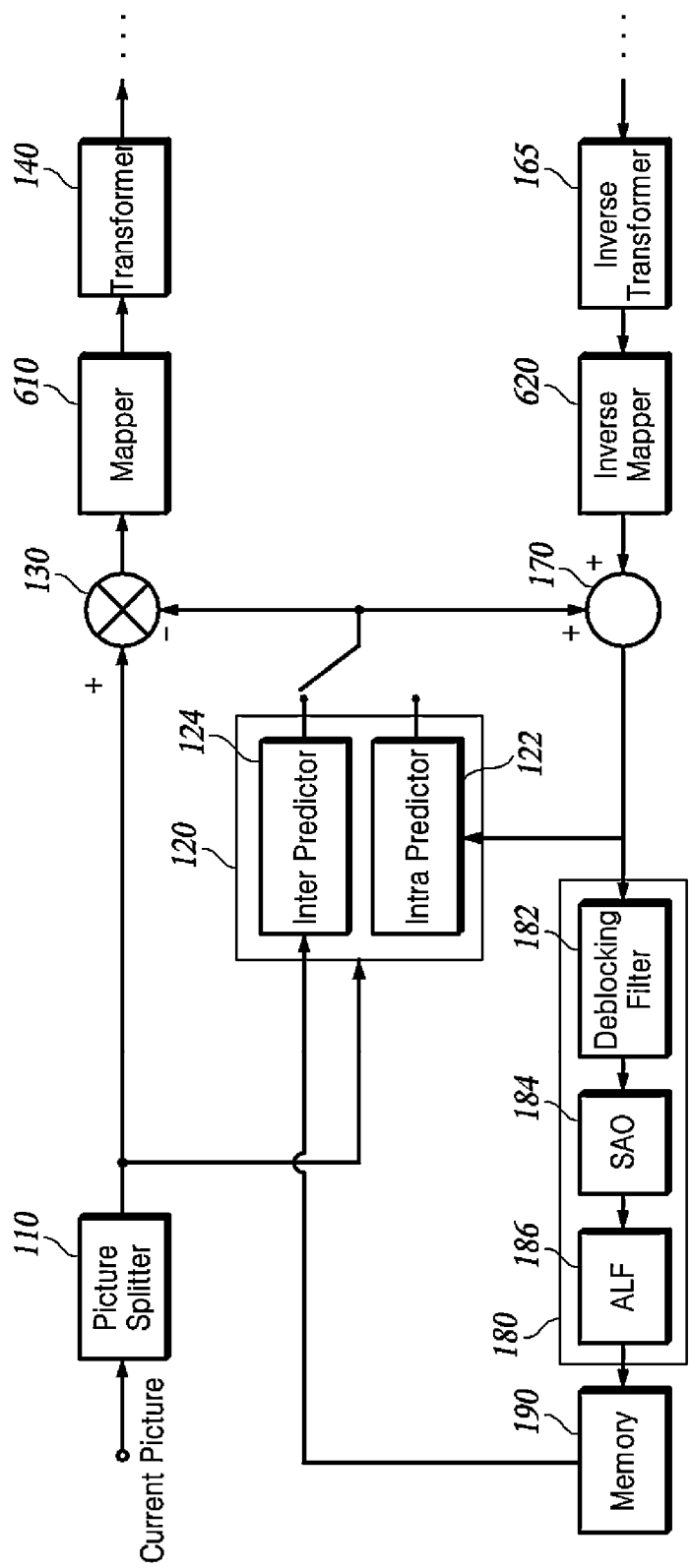
FIG. 6 is a block diagram conceptually illustrating a video encoding device utilizing a mapping of residual samples according to at least one embodiment of the present disclosure.

FIG. 6 is a block diagram conceptually illustrating a video encoding device utilizing a mapping of residual samples according to at least one embodiment of the present disclosure.

The video encoding device according to at least one embodiment of the present disclosure performs an adaptive mapping for residual samples of the current block in the current image and encodes the mapped residual samples. In addition to the components included in the embodiment illustrated in FIG. 1, the video encoding device may include a mapper 610 and an inverse mapper 620. The following discussion will focus on components that are related to or have added functionality of, mapping of residual samples.

The mapper 610 operates upon the residual samples of the current block to map sample values in a residual range to sample values in a mapping range by using a mapping relation. Here, the residual range refers to a range that includes the residual sample values. The mapping range is the range containing the mapping sample values. The mapping range corresponds to the residual range and is generated by the mapping relation. The mapped residual samples are transferred to the transformer 140 for quantization.

The sample values generated by the mapper 610 in the mapping range are used by the transformer 140, the quantizer 145, the entropy encoder 155, the inverse quantizer 160, and the inverse transformer 165, as partially illustrated in FIG. 6.

The inverse mapper 620 inversely maps the inverse transformed sample values to sample values in the residual range by using the inverse mapping relation to the aforementioned mapping relation for the inverse transformed samples generated by the inverse transform unit 165.

The sample values in the residual range generated by the inverse mapper 620 are used by the adder 170, as illustrated in FIG. 6.

Meanwhile, in terms of optimizing the coding efficiency, the video encoding device may determine a mapping relation and an inverse mapping relation. The mapping relation and the inverse mapping relation determined by the video encoding device may be transferred to the video decoding device for decoding the current block.

In the following description, the sample values in the residual range may be used interchangeably with the residual sample values, and the sample values in the mapping range may be used interchangeably with the mapping sample values. Further, an interval of the residual range may be used interchangeably with a residual interval, and an interval of the mapping range may be used interchangeably with a mapping interval. Hereinafter, the number of residual intervals may be expressed simply as the number of intervals.

Figure 7:
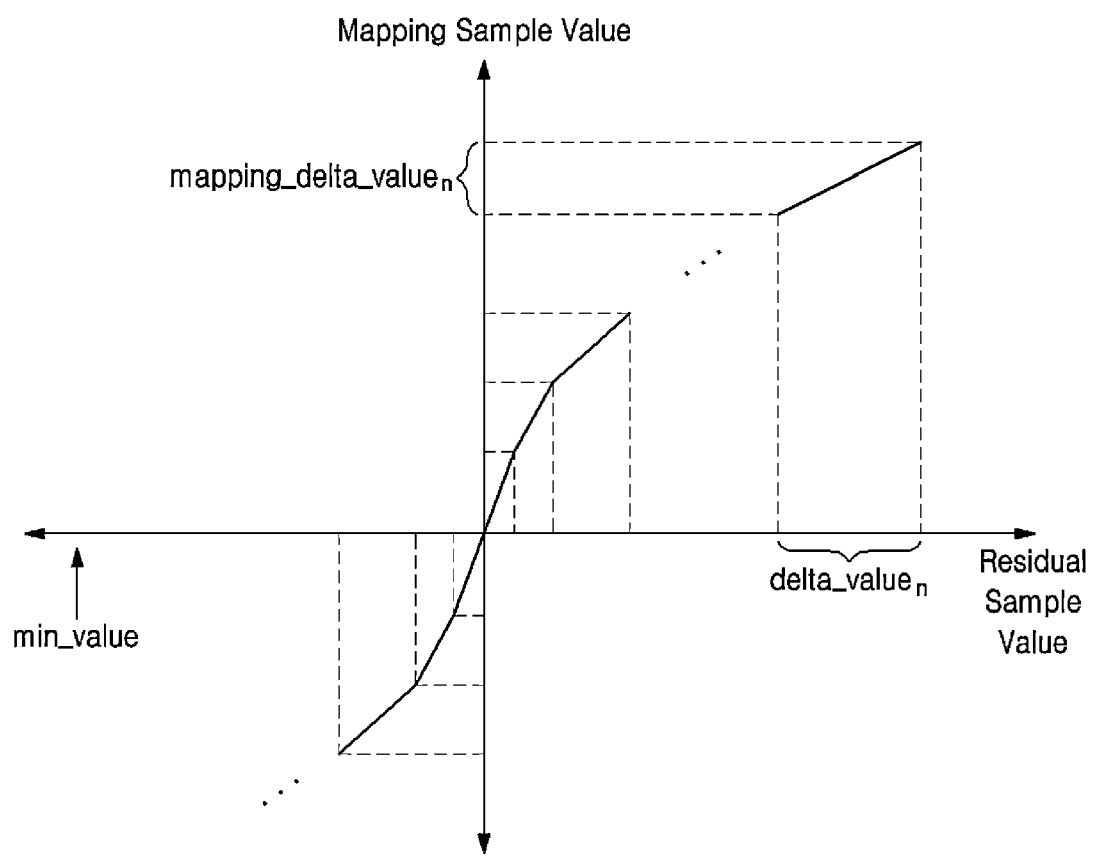
FIG. 7 is a diagram illustrating a mapping relation according to at least one embodiment of the present disclosure.

FIG. 7 is a diagram illustrating a mapping relation according to at least one embodiment of the present disclosure.

The video encoding device may determine a mapping relation between residual samples and mapping samples for the current block, such as the example in FIG. 7, and may transmit the determined mapping relation to the video decoding device. The mapping relation may be a preset relation based on an arrangement between the video encoding device and the video decoding device or may be adaptively changed. On the other hand, the transmission of the mapping relation may be omitted if the mapping relation is adaptively changed but the video decoding device can determine the mapping relation based on the decoding conditions without additional information.

Further, upon arranging to apply the mapping relation for each type of slice or picture, the video encoding device may omit the transmission of flags indicating whether the mapping relation is to be applied or not and information on the mapping relation (hereinafter referred to as mapping data or mapping_data). For example, if the mapping relation is to be applied to an intra-prediction slice and not to be applied to an inter-prediction slice, the video encoding device may transmit the flag and mapping data for the intra-prediction slice and may omit the transmission of the flag for the inter-prediction slice. Additionally, if the mapping relation is to be applied to the inter-prediction slice, the video encoding device may transmit the flag and mapping data for the inter-prediction slice.

In a mode skipping the transmission of residual samples at the block level (e.g., in the skip mode of the merge/skip mode), the video encoding device may omit the transmission of the flag indicating whether the mapping relation is to be applied at the block level. Furthermore, if the information of each pixel is encoded as a mapping value rather than an actual image value, such as in palette mode, the mapping relation according to the present embodiment may not be applied simultaneously. For example, when a slice or block is encoded according to the palette mode, the mapping relationship according to this embodiment is not applied, and thus video encoding device may omit the transmission of the relevant flag and mapping data.

As to the residual samples that are the subject of the mapping, the mapping data may include all or one or more of a minimum value, a maximum value, the number of residual intervals, or the size of each interval. Further, as to the mapping samples, the mapping data may include all or one or more of a minimum value, a maximum value, the number of mapping intervals, or each interval size. In this case, the size of each residual interval that divides the residual range between the maximum sample value and the minimum sample value may or may not be the same. Further, the number of mapping intervals may be the same as the number of residual intervals, but the size of each mapping interval may or may not be the same.

The video encoding device may adaptively determine the mapping relation based on the distribution of the residual samples. The residual samples typically have values close to zero but may have various distributions depending on the characteristics of the video or the prediction method.

Figure 8:
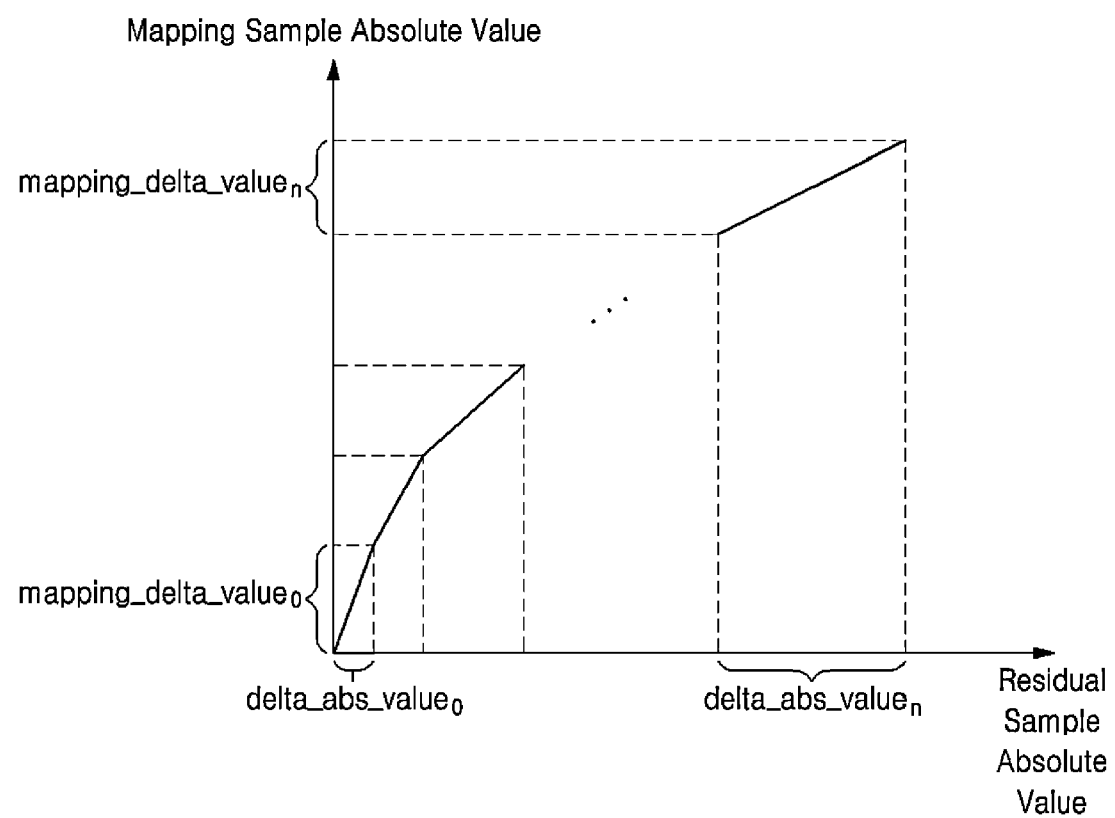
FIG. 8 is a diagram illustrating a mapping relation according to another embodiment of the present disclosure.

FIG. 8 is a diagram illustrating a mapping relation according to another embodiment of the present disclosure.

As illustrated in FIG. 8, as to the residual samples excluding the signs, a mapping relation may be expressed between residual samples and mapping samples. The mapping relation illustrated in FIG. 8 may be utilized under the assumption that the mapping relation illustrated in FIG. 7 can be symmetric with reference to the zero point. Transmission of the mapping relation illustrated in FIG. 8 may be more efficient than the mapping relation illustrated in FIG. 7, which, for a residual range, corresponds residual samples of all intervals to mapping samples. In the example of FIG. 8, the minimum value for the absolute value of the residual sample is set to zero, and the absolute value of the corresponding mapping sample is also mapped to zero.

Figure 9:
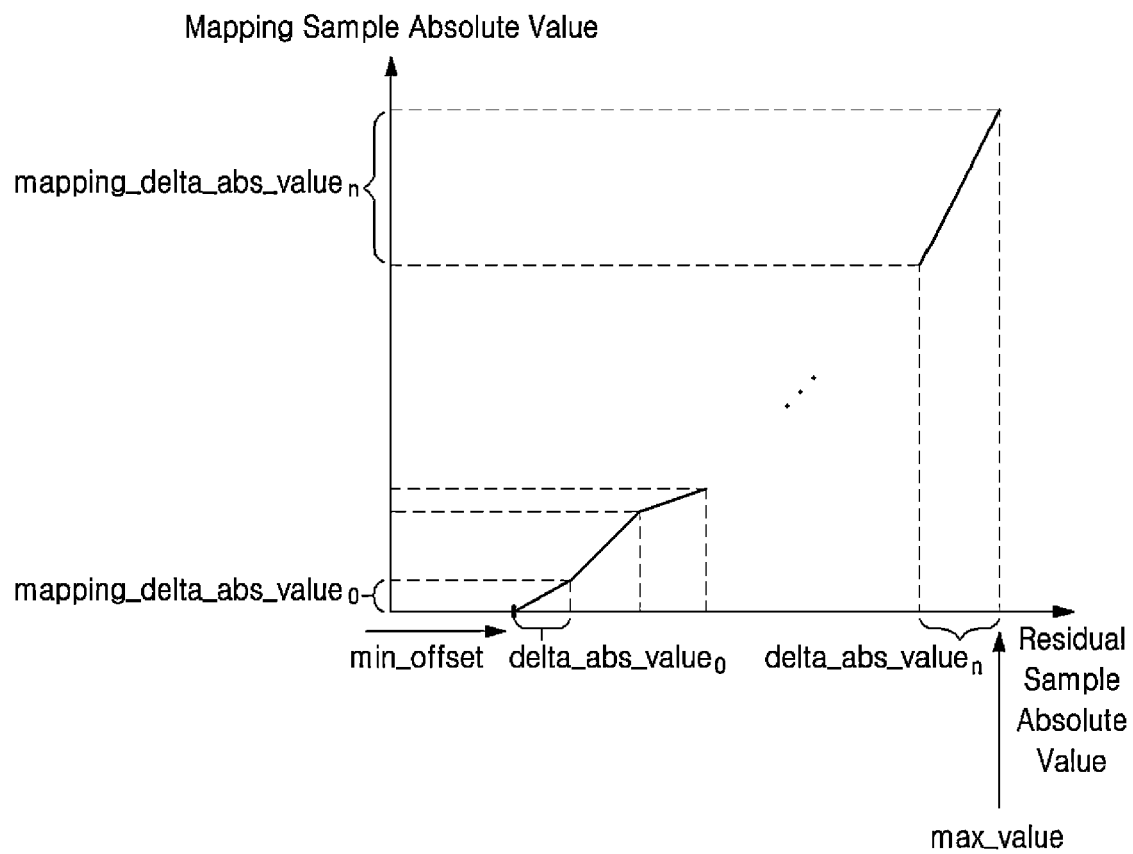
FIG. 9 is a diagram illustrating a mapping relation according to yet another embodiment of the present disclosure.

In another embodiment as shown in the example of FIG. 9, a mapping relation between residual samples and mapping samples may be expressed for residual samples with non-zero absolute values by using a minimum offset min_offset. For example, if the residual samples are not distributed between zero and a certain value, the mapping relation illustrated in FIG. 9 may be used to improve the coding efficiency.

The video encoding device may divide the residual range between the maximum value and the minimum value into n residual intervals and may define for each interval a mapping relation between the residual samples and the mapping samples, as shown in the examples of FIGS. 7, 8, and 9. The video encoding device may transmit mapping data including a minimum value of the residual samples, the number of residual intervals, each interval size, and the size of a mapping interval corresponding to each residual interval and thereby may communicate the defined mapping relation and the inverse mapping relation to the video decoding device.

The following describes, by using Table 1 to Table 7, the mapping relations as illustrated in FIGS. 7, 8, and 9.

The video encoding device may use a syntax as illustrated in Table 1 to transfer mapping data of mapping_data representing the mapping relation illustrated in FIG. 7 to the video decoding device.

TABLE 1

| mapping data( ) | |
|---|---|
| min_value | se(v) |
| num_interval | ue(v) |
| for(i=min_value; i<num_interval; i++) | |
| delta_value[i] | ue(v) |
| mapping_delta_value[i] | ue(v) |

Here, ue(v) and se(v) denote the syntax element in the form of an unsigned integer and a signed integer, respectively, with exponential Golomb encoding applied thereto.

In Table 1, the syntax element of min_value represents the minimum value among the residual sample values. Depending on how the syntax is represented, the sign and absolute value may be transmitted in separate syntaxes, and the minimum value of the residual samples may typically be negative, which allows only the absolute value may be transmitted without the sign, based on an arrangement between the video encoding device and the video decoding device.

In at least one embodiment, min_value may refer to a direct pixel value or may refer to an index. If it represents an index, the video encoding device may divide the residual range into preset A segments and may transmit the index of the interval corresponding to (or inclusive of) the minimum value. The actual pixel value may then be calculated by using the index of the interval and the size of the interval.

As another embodiment, the min_value may be a difference value of the prediction. The video encoding device operates upon a previously decoded image before the current image to predict a minimum value of the residual range of the previously decoded image as a minimum value of the current image. Then, the video encoding device may calculate a difference value between the predicted minimum value and the minimum value of the current image and may transmit the calculated difference value as min_value. The video decoding device may, in accord with the video encoding device, predict the minimum value of the residual range of the previously decoded image as the minimum value of the current image, and then sum the predicted minimum value and the difference value to determine the min_value. At this time, the previously decoded image used for prediction may be determined in the transmission unit of the mapping_data or other various division units according to the referencing method.

Depending on the transmission unit of the mapping_data, the predicted minimum value may be a pixel value or index corresponding to the minimum value of the immediately preceding decoded picture, subpicture, or slice in decoding chronological order. Alternatively, the predicted minimum value may be a pixel value or index corresponding to the minimum value of the first image in a group of pictures (GOP) containing the current image. If the first image of the GOP is an Instantaneous Decoding Refresh (IDR), the video encoding device may keep the predicted minimum value set to zero and may calculate and transmit a predicted difference value, or the video encoding device may skip any prediction to transmit the pixel value or index corresponding to the minimum value.

As another embodiment, if mapping_data is transmitted more than once for one coding sequence, the video encoding device may use previously transmitted mapping_data for prediction. The video encoding device may predict the minimum value by using the minimum value determined by the previously transmitted mapping_data, may calculate a difference value between the predicted minimum value and the minimum value of the current image, and may transmit the difference value as min_value, as described above. The video decoding device may use the previously determined minimum value and the presently received predicted difference value to determine the minimum value of the mapping_data of the current image.

As yet another embodiment, at the picture, subpicture, or slice level, a skip_data_flag may be transmitted indicating whether mapping data is to be transmitted. If this flag is 0, the video encoding device operates upon the residual sample values to signal mapping_data to the video decoding device. On the other hand, if this flag is 1, the video encoding device or video decoding device may use the mapping_data stored in memory after being determined and decoded just before.

The syntax element of num_interval represents the number n of residual intervals divided between the minimum value and the maximum values of the residual sample values. The number of intervals may have at least two values. Therefore, when transmitting the num_interval, the video encoding device may transmit a value obtained by subtracting 1 from the actual number of intervals, and the video decoding device may derive the number of intervals by adding 1 to the transmitted value. Alternatively, if a minimum number of intervals is agreed upon between the video encoding device and the video decoding device, the video encoding device may transmit the number of additional intervals generated by subtracting the minimum number of intervals from the actual number of intervals. The video decoding device may derive the number of intervals by adding a preset minimum number of intervals to the received value of intervals.

Further, num_interval may be a difference value of the prediction. The previously decoded image used for the prediction may be determined in various division units based on the transmission unit of the mapping_data or the referencing method. The predicted value of the number of intervals may be the number of intervals of the immediately preceding decoded picture, subpicture, or slice in decoding chronological order, based on the transmission unit of the mapping_data. Alternatively, the predicted value may be the number of intervals in the first image of the GOP containing the current image. If the first image of the GOP is an IDR, the video encoding device may keep the predicted value set to zero and may calculate and transmit a predicted difference value, or it may skip any prediction process to transmit the number of intervals.

As another embodiment, when the mapping_data is transmitted more than once for one coding sequence, the video encoding device may use the previously transmitted mapping_data for prediction. The video encoding device may generate a predicted value by using the number of intervals determined by the previously transmitted mapping_data, may calculate a difference value between the predicted value and the number of intervals of the current image, and may transmit the difference value as num_interval as described above. The video decoding device may use the previously determined number of intervals and the presently received predicted difference value to determine the number of intervals of the mapping_data of the current image.

When the predicted difference value is transmitted, the num_interval may have a sign. In some embodiments, the sign and absolute value of the difference value may be separated, and each may be transmitted as a separate syntax element.

The syntax element of delta_value indicates each interval size of the residual range. Each interval size may be set in pixel values. If each interval size is different, delta_value needs to be transmitted as many times as there are intervals. If each interval size is the same, the video encoding device may only transmit the same size value once. Alternatively, depending on an arrangement between the video encoding device and the video decoding device, the transmission may be omitted if each interval size is the same.

As another embodiment, the delta_value may be a difference value between the i-th residual interval size and the (i−1)th residual interval size. Further, when the difference value is transmitted, the delta_value may have a sign. In some embodiments, the sign and absolute value of the difference value may be separated, and each may be transmitted as a separate syntax element.

As yet another embodiment, when the video encoding device and the video decoding device are designed to have each interval size of the residual range to be the same, there may be no transmission of the delta_value. Alternatively, the delta_value may be a difference value from a delta_value in the immediately preceding decoded mapping_data. Here, the immediately preceding decoded mapping_data represents the mapping_data transmitted according to the transmission unit of the mapping_data, determined at a higher level, such as the previous block, previous slice, previous frame, and the like.

The syntax element of mapping_delta_value indicates the size of the mapping interval corresponding to each interval of the residual range. The size of each mapping interval may be set in pixel values.

As another embodiment, the mapping_delta_value may be a difference value between the i-th mapping interval size and the (i−1)th mapping interval size.

As yet another embodiment, the mapping_delta_value may be a predicted difference value generated from a predicted value of the mapping interval size. The video encoding device may generate the difference value by considering the size of the corresponding residual interval size as the predicted value to predict the i-th mapping interval size and then may transmit the difference value. For example, the embodiment assumes the residual interval size of 10 for delta_value0, the residual interval size of 12 for delta_value1, and the mapping interval size of 15 corresponding to those residual intervals. In this case, the video encoding device may calculate the delta_value1 as 2 and the mapping_delta_value1 as 3 and may transmit these values. Meanwhile, the video decoding device may determine the interval size of the mapping_delta_value1 to be (delta_value0+delta_value1+mapping_delta_value1).

On the other hand, when the difference value is transmitted, the mapping_delta_value may have a sign. In some embodiments, the sign and absolute value of the difference value may be separated, and each may be transmitted as a separate syntax element.

As another embodiment, if the skip_data_flag transmitted at the picture, subpicture, or slice level is 0, the video encoding device may generate and transmit mapping_data for the residual sample values. On the other hand, if the skip_data_flag is 1, the video encoding device may use the mapping_data stored in the memory 190 as it was previously generated. Additionally, the video decoding device may use the mapping_data previously generated and stored in the memory 570.

The video encoding device may use syntax as illustrated in Table 2 to transfer to the video decoding device the mapping data of mapping_data representing the mapping relation illustrated in FIG. 8.

TABLE 2

| mapping data( ) | |
| --- | --- |
| num_interval | ue(v) |
| for(i=0; i<num_interval; i++) | |
| delta_value[i] | ue(v) |
| mapping_delta_value[i] | ue(v) |

As described above, the mapping relation illustrated in FIG. 8 is based on the absolute values of the residual samples and the absolute values of the mapping samples. Therefore, the minimum value of the absolute values is 0, which may allow to skip the transmission of min_value as shown in Table 2.

The video encoding device may use syntax as illustrated in Table 3 to transfer to the video decoding device the mapping data of mapping_data representing the mapping relation illustrated in FIG. 9.

TABLE 3

| mapping data( ) | |
| --- | --- |
| min_offset | se(v) |
| num_interval | ue(v) |
| for(i=min_offset; i<num_interval; i++) | |
| delta_value[i] | ue(v) |
| mapping_delta_value[i] | ue(v) |

As illustrated in FIG. 9, if the minimum value of the residual samples is non-zero, the minimum value may be represented by an offset, as shown in Table 3.

In at least one embodiment, a mapping relation may be present to reflect that there is no distribution of the residual samples in some intervals. The video encoding device may use syntax as illustrated in Table 4 to transfer to the video decoding device the mapping data of mapping_data representing such a mapping relation.

TABLE 4

| | |
|---|---|
| mapping data( ) | |
|   num_interval | ue(v) |
|   for(i=0, j=0; i<num_interval; i++) | |
|     delta_value[i] | ue(v) |
|     mapping_flag | u(1) |
|     if(mapping_flag) | |
|       mapping_delta_value[j] | ue(v) |
|       j++ | |

Here, u(1) represents the syntax element in the form of a 1-bit unsigned integer.

The syntax element of mapping_flag indicates the presence or absence of a mapping interval corresponding to each interval of the residual range. The video encoding device transmits a mapping_delta_value when the mapping_flag is 1. Therefore, the number of residual intervals and the number of mapping intervals may not be equal if empty intervals are present.

In another embodiment, the mapping relation between residual samples and mapping samples may be transmitted with a simplified mapping relation for the chroma component to improve coding efficiency. The video encoding device may use syntax as illustrated in Table 5 to transfer to the video decoding device the mapping data of mapping_data representing the simplified mapping relation.

TABLE 5

| | |
|---|---|
| mapping data( ) | |
|   num_interval | ue(v) |
|   for(i=min_value; i<num_interval; i++) | |
|     delta_value[i] | ue(v) |
|     mapping_delta_value[i] | ue(v) |
|     Cr_scale_value[i] | |
|       Cb_scale_value[i] | |

In Table 5, the mapping_data includes the interval that represents the mapping relation of the luma component and includes scale values that correspond to that interval. The scale values express the mapping relation of the chroma component. The scale values include a scale value for the first chroma component and a scale value for the second chroma component. Using the scale values for the residual samples and the mapping samples of the chroma component, a mapping relation may be defined for each interval. The video encoding device may adaptively adjust the scale values according to the bit depth of the chroma component or the bit depth of the residual samples of the chroma component and may transmit the adjusted scale values in the form of integers.

Another embodiment may transmit only one of the scale value for the first chroma component and the scale value for the second chroma component and may use the same scale value for the first chroma component and the second chroma component. The video encoding device may use syntax as illustrated in Table 6 to transmit to the video decoding device the mapping data of mapping_data representing the aforementioned mapping relation.

TABLE 6

| | |
|---|---|
| mapping data( ) | |
|   num_interval | ue(v) |
|   for(i=min_value; i<num_interval; i++) | |
|     delta_value[i] | ue(v) |
|     mapping_delta_value[i] | ue(v) |
|     Cr_scale_value[i] | |

In some embodiments, the scale value of the first chroma component and the scale value of the second chroma component may have opposite signs. For example, the scale value according to Table 6 may be applied unaltered to the first chroma component, and the scale value of the first chroma component multiplied by '-1' may be applied to the second chroma component. If this method is steadily applied to all intervals according to an arrangement between the video encoding device and the video decoding device, no separate syntax may need to be transmitted. However, if the sign of the scale value of the first chroma component is not always opposite to that of the scale value of the second chroma component, the video encoding device may additionally transmit a sign value of the scale for each interval according to a syntax as illustrated in Table 7.

TABLE 7

| | |
|---|---|
| mapping data( ) | |
|   num_interval | ue(v) |
|   for(i=min_value; i<num_interval; i++) | |
|     delta_value[i] | ue(v) |
|     mapping_delta_value[i] | ue(v) |
|     Cr_scale_value[i] | |
|       scale_sign[i] | u(1) |

Some embodiments may not transmit the scale values for the chroma component, when the video decoding device may derive the scale values. For example, the video decoding device may derive the scale values by using a ratio of delta_value [i] to mapping_delta_value [i] for each interval. For example, the video decoding device may determine the value obtained by dividing the mapping_delta_value [i] by the delta_value [i] as the scale values of the chroma component. In this case, a scaling operation considering the bit depth of the internal memory may be performed for the division operation of mapping_delta_value [i] and delta_value [i]. In other words, if the bit depth is not the same between the luma component and the chroma component, the video decoding device may normalize the scale values by applying a shift operation to the value of mapping_delta_value [i] divided by delta_value [i] by the difference in the bit depth between the luma component and the chroma component. The operations of the preceding embodiments describe a process for deriving the scale values, and the division operation may be replaced by a right shift for ease of operation.

In at least one embodiment, the video encoding device may transmit mapping data in various units, such as CTUs, slices, subpictures, pictures, picture groups, and the like. Alternatively, the video encoding device may omit the transmission of mapping data. In addition, for efficiency of transmission, the video encoding device may store previously used mapping data in memory and may use the same mapping data or predict some of the mapping data to use the predicted mapping data. For example, when using the same previously used mapping data, the present disclosure may parse, before parsing the mapping data, a mapping data flag indicating whether a mapping relation is to be applied. If the mapping data flag is 0, with no further parsing of the mapping data, the same mapping data used in the previous transmission unit may be used. If the mapping data flag is 1, new mapping data may be transmitted and then used.

In another embodiment, the mapping interval according to the residual samples may be represented by a single interval. In such a case, the transmission of num_interval corresponding to the number of intervals and data indicating the respective interval sizes may be omitted.

Alternatively, when the mapping interval is one according to the examples of FIG. 8 or FIG. 9, the relationship between the absolute values of the residual samples and the absolute values of the mapping samples may be represented by a first-order function of a single straight line. Therefore, the video encoding device may transmit the mapping data in the form of a function rather than a relationship of points being mapped on the x and y axes. After expressing the mapping relation by defining the relation between the residual samples and the mapping samples in the form of 'y=ax+b', the video encoding device may transmit the values of a and b to the video decoding device.

Alternatively, for the efficiency of mapping data transmission, instead of defining the residual range as a plurality of intervals and transmitting mapping data for each interval, the mapping relation may be defined as an equation of n-th degree in a single interval. The video encoding device may transmit the coefficients of the relevant function and thereby may transmit the mapping relation to the video decoding device.

Alternatively, to increase the efficiency of the mapping, the mapping relation may be defined as an nth-order function for each interval of the residual range. In the examples of FIGS. 7, 8, and 9, the relationship between the residual samples and the mapping samples is in the form of a first-order function in each interval, but a separate nth-order function may be defined as the mapping relation for each interval for precise mapping. To improve transmission efficiency, the video encoding device may transmit to the video decoding device an index indicating one function included in a function list predefined for each nth-order function for each interval. The function list may include information on the order number and coefficients of the function. The video encoding device and the video decoding device may define a mapping relation in each interval by using the function information based on the function list in addition to the interval information of the residual samples and the mapping samples.

On the other hand, the predictor 120 may use a combination of intra prediction and inter prediction for the current block, which is the prediction unit. The predicted signals by the intra prediction and the predicted signals by the inter prediction may be combined into final predicted signals based on filtering (e.g., weighted summing). In yet another embodiment, when the current block is split into sub-blocks, the predictor 120 may apply at least one of the intra-prediction and inter-prediction methods to each sub-block.

When applying the deblocking filter 182 to the reconstructed video including the reconstructed current block as described above, the video encoding device may utilize a strong filter or a weak filter in terms of filtering strength. The video encoding device may utilize the mapping relation in determining the presence or absence of deblocking filtering and the strength of the filtering.

The pixel values, which are being filtered, falling in the same interval, i.e., the same delta_value interval mean that the pixel values are mapped and inversely mapped by the same slope. In at least one embodiment, a strong filter may be utilized if the pixel values on the boundary or interface, which are being deblocked-filtered, fall in different delta_value intervals. In another embodiment, if the interval slope is less than 1, i.e., if the delta_value intervals in the residual range are mapped to a narrower range of mapping_delta_value intervals, the strong filter may be used, assuming that an error due to mapping is introduced in addition to quantization error.

In applying the deblocking filter, the video encoding device may process a plurality of vertical interfaces in parallel when performing vertical filtering. Additionally, when performing horizontal filtering, a plurality of horizontal interfaces may be processed in parallel.

When applying the SAO filter 184 to the reconstructed video including the reconstructed current block as described above, the video encoding device may use the mapping relation to determine the presence or absence of offset correction or the strength of the offset correction. For example, offset correction may not be performed at one or smaller slope of the mapping interval containing the samples to be offset corrected.

Another embodiment may determine as the final correction value a value generated by multiplying a correction value by a weight determined by the slope of the interval containing the samples to be offset corrected and may use the final correction value to perform the offset correction. Alternatively, if the interval slope is greater than 1, the embodiment may determine as the final correction value a value generated by multiplying a correction value by a weight determined by the slope of the interval containing the samples to be offset corrected and may use the final correction value to perform the offset correction. Alternatively, if the interval slope is less than 1, the embodiment may determine as the final correction value a value generated by multiplying a correction value by a weight determined by the slope of the interval containing the samples to be offset corrected and may use the final correction value to perform the offset correction.

Figure 10:
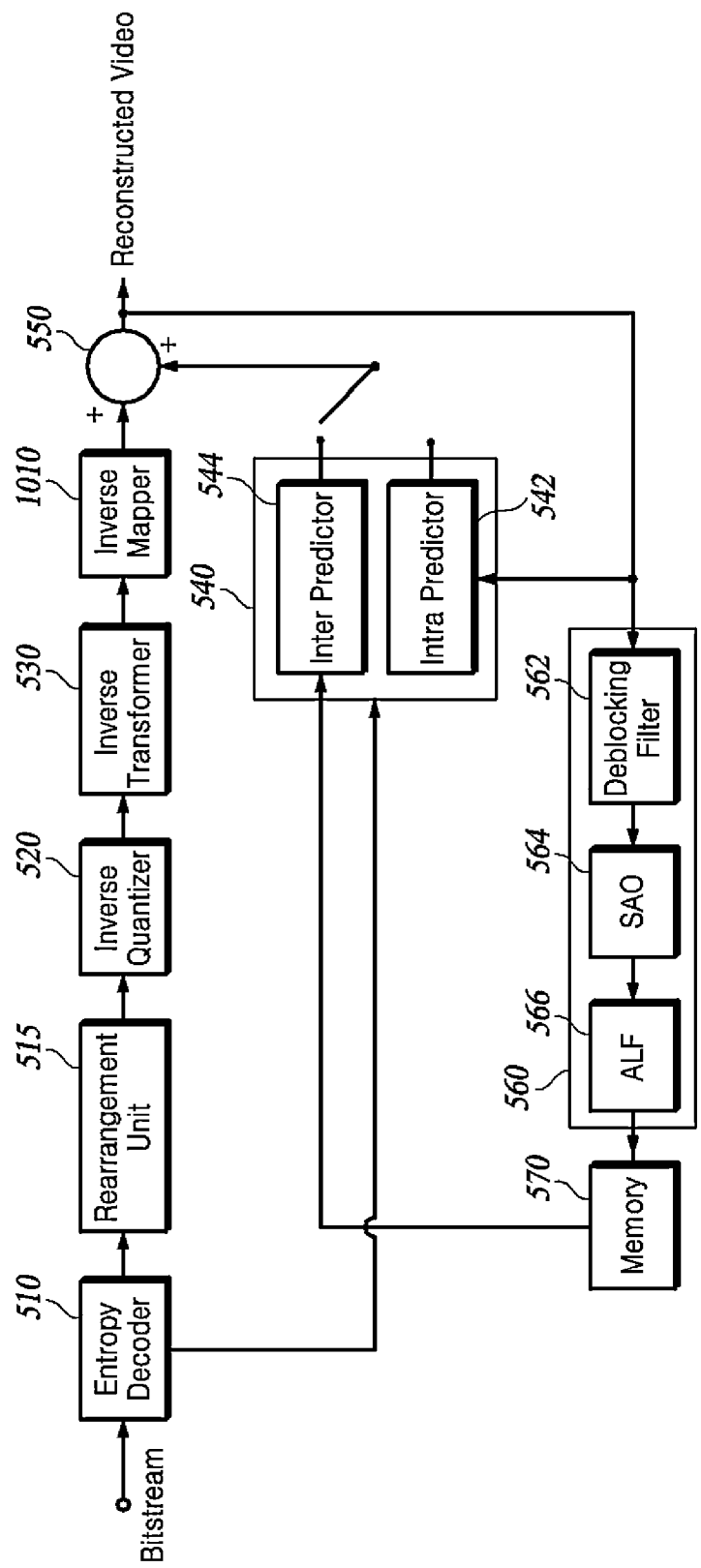
FIG. 10 is a block diagram conceptually illustrating a video decoding device utilizing a mapping of residual samples according to at least one embodiment of the present disclosure.

FIG. 10 is a block diagram conceptually illustrating a video decoding device utilizing a mapping of residual samples according to at least one embodiment of the present disclosure.

The video decoding device according to this embodiment of the present disclosure may perform adaptive inverse mapping on the residual samples of the current block and may use the inversely mapped residual samples to decode the current block. In addition to the components included in the embodiment illustrated in FIG. 5, the video decoding device may include an inverse mapper 1010. The following discussion focuses on components related to the inverse mapping of residual signals or related with added functions.

The inverse mapper 1010 operates upon the inverse transformed samples generated by the inverse transformer 165 to inversely map the inverse transformed sample values to sample values in the residual range by using an inverse mapping relation to the mapping relation described above.

The sample values in the residual range generated by the inverse mapper 1010 are used by the adder 550, as illustrated in FIG. 10.

Meanwhile, the mapping relation described above may be transmitted as information on the mapping relation, i.e., the mapping data of mapping_data from the video encoding device to the video decoding device. Accordingly, the video decoding device may decode the current block by using the mapping_data as illustrated in Table 1 to Table 7. The mapping_data illustrated in Tables 1 to 7 has already been described.

Meanwhile, the predictor 540 may use a combination of intra prediction and inter prediction for the current block which is the prediction unit. In this case, the predicted signals by the intra prediction and the predicted signals by the inter prediction may be combined into final predicted signals based on filtering (e.g., weighted summing). In another embodiment, if the current block is split into subblocks, the predictor 540 may apply at least one of the intra prediction and inter prediction to each sub-block.

When applying the deblocking filter 562 to the reconstructed video including the reconstructed current block as described above, the video decoding device may utilize a strong filter or a weak filter in terms of filtering strength. The video decoding device may utilize the mapping relation in determining the presence or absence of deblocking filtering and the strength of the filtering.

In at least one embodiment, a strong filter may be utilized if the pixel values on the interface, which are deblocked fall within different delta_value intervals. In another embodiment, if the interval slop is less than 1, i.e., if the delta_value interval of the original range is mapped to a narrower range of mapping_delta_value interval, the strong filter may be used, assuming that an error due to mapping is introduced in addition to quantization error.

In applying the deblocking filter 562, the video decoding device may process a plurality of vertical interfaces in parallel when performing vertical filtering. Additionally, in performing horizontal directional filtering, a plurality of horizontal interfaces may be processed in parallel.

When applying the SAO filter 564 to the reconstructed video including the reconstructed current block as described above, the video decoding device may use the mapping relation to determine the presence or absence of offset correction or the strength of the offset correction. For example, offset correction may not be performed at one or smaller slope of the mapping interval containing the samples to be offset corrected.

Another embodiment may determine as the final correction value a value generated by multiplying a correction value by a weight determined by the slope of the interval containing the samples to be offset corrected and may use the final correction value to perform the offset correction. Alternatively, if the interval slope is greater than 1, the embodiment may determine as the final correction value a value generated by multiplying a correction value by a weight determined by the slope of the interval containing the samples to be offset corrected and may use the final correction value to perform the offset correction. Alternatively, if the interval slope is less than 1, the embodiment may determine as the final correction value a value generated by multiplying a correction value by a weight determined by the slope of the interval containing the samples to be offset corrected and may use the final correction value to perform the offset correction.

On the other hand, the embodiments illustrated in FIGS. 6 and 10 are not described for each of the luma component and the chroma component, although they may be equally applicable to the luma component and the chroma component. In this case, mapping_data may be transmitted for each of the luma component and the chroma component from the video encoding device to the video decoding device. Additionally, if the embodiments apply to only one of the luma component or the chroma component, the mapping_data for that component may be transmitted from the video encoding device to the video decoding device.

Figure 11:
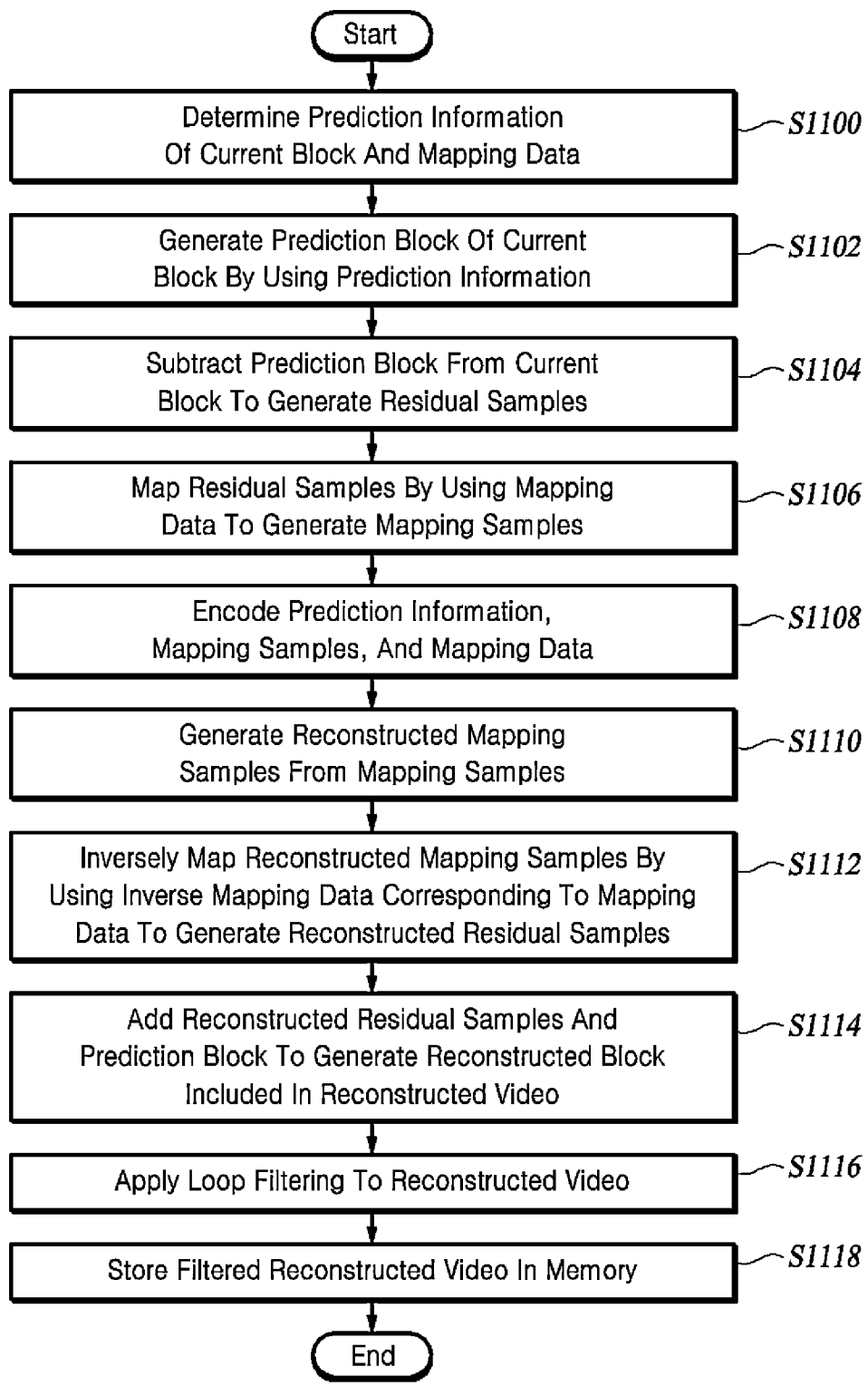
FIG. 11 is a flowchart of a video encoding method utilizing a mapping of residual samples according to at least one embodiment of the present disclosure.

FIG. 11 is a flowchart of a video encoding method utilizing a mapping of residual samples according to at least one embodiment of the present disclosure.

The video encoding device determines the prediction information and mapping data of the current block (S1100).

Here, the prediction information may be a prediction mode of the intra prediction. In terms of rate-distortion optimization, the video encoding device may determine the prediction mode of the intra prediction. Alternatively, the prediction information may be a reference picture index and a motion vector of the inter prediction. In terms of optimizing rate-distortion, the video encoding device may determine the reference picture index and the motion vector.

The mapping data may include, for the current image from which the residual samples are derived, all or one or more of a minimum value of the residual range, the number of residual intervals obtained by dividing the residual range, each interval size, or the size of each mapping interval corresponding to each residual interval, as its components. As another embodiment, the mapping data may include all or one or more of the aforementioned components in the form of a difference value.

The video encoding device uses the prediction information to generate a prediction block of the current block (S1102).

The video encoding device may generate a prediction block by performing intra prediction by applying the prediction mode to previously reconstructed blocks. Alternatively, the video encoding device may generate the prediction block by selecting a reference picture from the reference images stored in the memory by using a reference picture index and then by performing an inter prediction by applying a motion vector to the reference picture.

The video encoding device subtracts the prediction block from the current block to generate residual samples (S1104).

The video encoding device generates the mapping samples by mapping the residual samples from the residual range to the mapping range by using the mapping data (S1106).

The video encoding device encodes the prediction information, the mapping samples, and the mapping data to generate a bitstream (S1108). To generate the bitstream, the video encoding device may apply all or some of the transform, quantization, and entropy encoding to the mapping samples.

The video encoding device generates reconstructed mapping samples from the mapping samples (S1110). To generate the reconstructed mapping samples, the video encoding device may apply all or some of the transform, quantization, inverse quantization, or inverse transform to the mapping samples.

The video encoding device inversely maps the reconstructed mapping samples from the mapping range to the residual range by using inverse mapping data corresponding to the mapping data to generate the reconstructed residual samples (S1112).

The video encoding device adds the reconstructed residual samples and the prediction block to generate a reconstructed block that is included in the reconstructed video (S1114).

The video encoding device applies loop filtering to the reconstructed video (S1116).

The video encoding device stores the filtered reconstructed video in memory (S1118). The reconstructed video stored in the memory may be used as reference images in the future.

Figure 12:
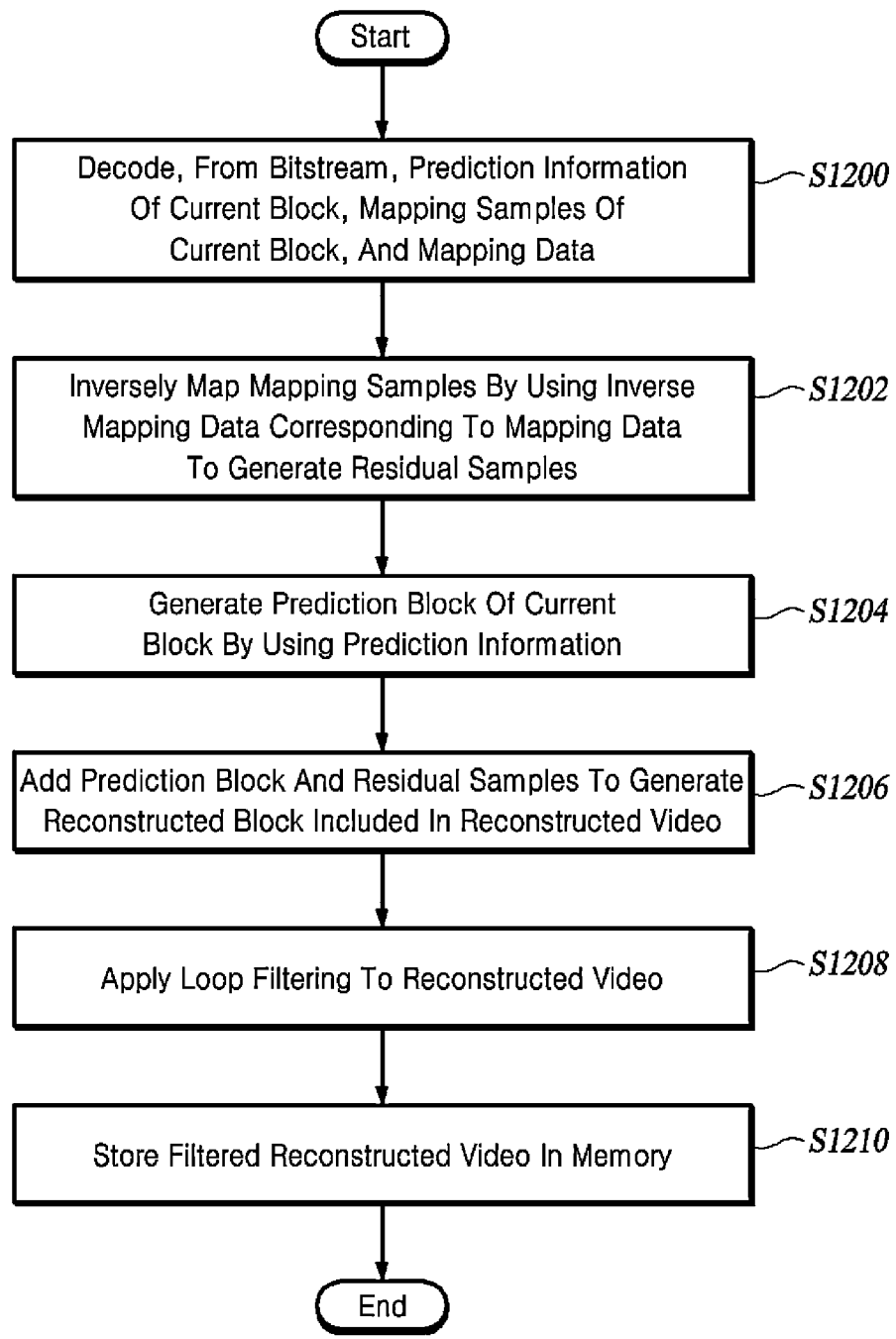
FIG. 12 is a flowchart of a video decoding method utilizing a mapping of residual samples according to at least one embodiment of the present disclosure.

FIG. 12 is a flowchart of a video decoding method utilizing a mapping of residual samples according to at least one embodiment of the present disclosure.

The video decoding device decodes, from the bitstream, the prediction information of the current block, the mapping samples of the current block, and the mapping data (S1200).

Here, the prediction information may be a prediction mode of the intra prediction. Alternatively, the prediction information may be a reference picture index and a motion vector of the inter prediction.

The mapping data may include, for the current image from which the residual samples are derived, all or one or more of a minimum value of the residual range, the number of residual intervals obtained by dividing the residual range, each interval size, or the size of each mapping interval corresponding to each residual interval, as its components. As another embodiment, the mapping data may include all or one or more of the aforementioned components in the form of a difference value.

The mapping samples are residual samples mapped by the video encoding device based on the mapping data.

The video decoding device generates the residual samples by inversely mapping the mapping samples from the mapping range to the residual range based on the inverse mapping data corresponding to the mapping data (S1202).

The video decoding device generates a prediction block of the current block by using the prediction information (S1204).

The video decoding device may generate the prediction block by performing intra prediction by applying the prediction mode to previously reconstructed blocks. Alternatively, the video decoding device may generate the prediction block by selecting a reference picture from the reference images stored in the memory by using a reference picture index and then by performing inter prediction by applying a motion vector to the reference picture.

The video decoding device adds the prediction block and the residual samples to generate a reconstructed block that is included in the reconstructed video (S1206).

The video decoding device applies loop filtering to the reconstructed video (S1208).

The video decoding device stores the filtered reconstructed video in memory (S1210). The reconstructed video stored in the memory may be utilized as reference images in the future.

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in the present disclosure are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media, such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which the present disclosure pertains should understand that the scope of the present disclosure should not be limited by the above explicitly described embodiments but by the claims and equivalents thereof.

REFERENCE NUMERALS

120: predictor
540: predictor
610: mapper
620: inverse mapper
1010: inverse mapper

What is claimed is:

1. A method of decoding a current block by a video decoding device, the method comprising:
   decoding, from a bitstream, prediction information of the current block, mapping data, and mapping samples of the current block, the mapping samples being residual samples mapped by the video encoding device based on the mapping data;
   generating the residual samples based on inverse mapping data corresponding to the mapping data by inversely mapping the mapping samples from a mapping range to a residual range;
   generating a prediction block of the current block by using the prediction information; and
   generating a reconstructed block that is included in a reconstructed video by adding the prediction block and the residual samples.

2. The method of claim 1, further comprising:
   applying loop filtering to the reconstructed video.

3. The method of claim 1, wherein the mapping data includes:
   for a current image from which the residual samples are derived, all or one or more of a minimum value of the residual range, a certain number of residual intervals obtained by dividing the residual range, a size of each residual interval, or a size of each mapping interval corresponding to each residual interval, as components, wherein all or one or more of the components are difference values.

4. The method of claim 3, wherein, when the mapping data is generated by using absolute values of the residual samples, the mapping data does not include the minimum value.

5. The method of claim 3, wherein decoding from the bitstream includes:
   generating an actual number of the residual intervals by adding 1 to the number of the residual intervals.

6. The method of claim 3, wherein when the mapping data includes a difference value of the size of each residual interval, the size of each residual interval is equal to a difference value between a size of a current residual interval and a size of a previous residual interval.

7. The method of claim 3, wherein, when the mapping data includes a difference value of the size of each mapping interval, the size of each mapping interval is determined by generating a size of a corresponding residual interval within the residual range as a size of a predicted mapping interval of the current image, and then adding the size of the predicted mapping interval and the difference value of the size of each mapping interval.

8. The method of claim 3, wherein the mapping data includes:
a flag indicating whether the each mapping interval is an empty interval that has no mapping sample value corresponding to a residual sample value.

9. The method of claim 1, further comprising:
decoding from the bitstream a skip flag indicating whether the mapping data, transmitted at a picture level, a subpicture level, or a slice level, is to be transmitted,
wherein, when the skip flag is true, the method includes using immediately preceding mapping data stored in a memory in place of decoding the mapping data.

10. The method of claim 3, wherein the mapping data includes:
scale values each corresponding to each residual interval, wherein the scale values represent a mapping relation of chroma components.

11. The method of claim 3, wherein the decoding from the bitstream includes:
determining a value obtained by dividing the size of each mapping interval by the size of the residual interval as each of scale values representing a mapping relation of chroma components.

12. A method encoding a current block by a video encoding device, the method comprising:
determining prediction information of the current block and mapping data of the current block;
generating a prediction block of the current block by using the prediction information;
generating residual samples by subtracting the prediction block from the current block;
generating mapping samples by mapping the residual samples from a residual range to a mapping range by using the mapping data; and
encoding the prediction information, the mapping samples, and the mapping data.

13. The method of claim 12, further comprising:
generating reconstructed mapping samples from the mapping samples; and
generating reconstructed residual samples by using inverse mapping data corresponding to the mapping data by inversely mapping the reconstructed mapping samples from the mapping range to the residual range.

14. The method of claim 13, further comprising:
generating a reconstructed block to be included in a reconstructed video by adding the reconstruction residual samples and the prediction block; and
applying loop filtering to the reconstructed video.

15. The method of claim 12, wherein the mapping data includes:
for the residual samples, all or one or more of a minimum value of the residual range, a certain number of residual intervals obtained by dividing the residual range, a size of each residual interval, or a size of each mapping interval corresponding to each residual interval, as components, wherein all or one or more of the components are difference values.

16. The method of claim 15, wherein encoding the prediction information, the mapping samples, and the mapping data includes:
generating the number of the residual intervals by subtracting 1 from an actual number of the residual intervals, and then encoding the number of the residual intervals.

17. The method of claim 12, further comprising:
determining a skip flag indicating whether the mapping data, transmitted at a picture level, a subpicture level, or a slice level, is to be transmitted; and
encoding the skip flag,
wherein, when the skip flag is true, the method includes using immediately preceding mapping data stored in a memory in place of encoding the mapping data.

18. A computer-readable recording medium storing a bitstream generated by a video encoding method, the video encoding method comprises:
determining prediction information of a current block and mapping data of the current block;
generating a prediction block of the current block by using the prediction information;
generating residual samples by subtracting the prediction block from the current block;
generating mapping samples by using the mapping data by mapping the residual samples from a residual range to a mapping range; and
encoding the prediction information, the mapping samples, and the mapping data.

* * * * *